US 6,721,954 B1

(12) United States Patent
Nickum (10) Patent No.: US 6,721,954 B1
(45) Date of Patent: Apr. 13, 2004

(54) PERSONAL PREFERRED VIEWING USING ELECTRONIC PROGRAM GUIDE (75) Inventor: Larry A. Nickum, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/339,075

(22) Filed: Jun. 23, 1999

(51) Int. Cl.[7] .......................... H04N 5/445; G06F 3/00; G06F 13/00
(52) U.S. Cl. ........................ 725/46; 725/53; 725/58; 386/83
(58) Field of Search .................... 725/46, 47, 45, 725/44, 39, 61, 58, 55, 53, 54, 28, 38, 131, 132, 134, 140, 142; 348/906; 386/83; H04N 5/445, 7/16, 7/08; G06F 3/00, 13/00

(56) References Cited

U.S. PATENT DOCUMENTS

| 4,547,804 A | 10/1985 | Greenberg | 358/142 |
| 4,843,562 A | 6/1989 | Kenyon et al. | 364/487 |
| 4,945,412 A | 7/1990 | Kramer | 358/142 |
| 5,231,493 A | 7/1993 | Apitz | 358/146 |
| 5,253,066 A | * 10/1993 | Vogel | 725/28 |
| 5,307,173 A | 4/1994 | Yuen et al. | 358/335 |
| 5,485,518 A | 1/1996 | Hunter et al. | 380/20 |
| 5,526,427 A | 6/1996 | Thomas et al. | 380/20 |
| 5,559,548 A | 9/1996 | Davis et al. | 348/6 |
| 5,635,978 A | 6/1997 | Alten et al. | 348/7 |
| 5,642,153 A | 6/1997 | Chaney et al. | 348/7 |
| 5,659,653 A | 8/1997 | Diehl et al. | 386/46 |
| 5,666,645 A | 9/1997 | Thomas et al. | 455/6.1 |
| 5,671,411 A | 9/1997 | Watts et al. | 395/615 |
| 5,692,214 A | 11/1997 | Levine | 395/833 |
| 5,710,605 A | 1/1998 | Nelson | 348/734 |
| 5,737,477 A | 4/1998 | Tsutsumi | 386/83 |
| 5,758,257 A | 5/1998 | Herz et al. | 455/2 |
| 5,767,893 A | 6/1998 | Chen et al. | 348/7 |
| 6,002,394 A | * 12/1999 | Schein et al. | 345/327 |
| 6,008,802 A | * 12/1999 | Iki et al. | 345/327 |
| 6,091,884 A | * 7/2000 | Yuen et al. | 386/83 |
| 6,141,488 A | * 10/2000 | Knudson et al. | 386/83 |
| 6,163,316 A | * 12/2000 | Killian | 345/327 |

* cited by examiner

Primary Examiner—Vivek Srivastava
(74) Attorney, Agent, or Firm—Walter Malinowski; Mark S. Walker (57) ABSTRACT A method and system for implementing a preferred viewing library of programs are disclosed. Electronic program guide data is searched for a program satisfying a criterion, and a determination is made whether the program satisfies the criterion. The criterion may be based upon the viewing activity profile of the user or may be based upon a criterion entered into the program guide by the user. In the event a program satisfies the criterion, the recording of the program is scheduled to occur at a predetermined time. The time is monitored, and a determination whether the present time is the predetermined time. At the predetermined time, the program is recorded and organized in a program library such that a user may select the program from the program library and view the recorded program at an appropriate time.

22 Claims, 4 Drawing Sheets

PERSONAL PREFERRED VIEWING USING ELECTRONIC PROGRAM GUIDE

FIELD OF THE INVENTION

The present invention generally relates to the field of information handling systems, and particularly to an electronic program guide for preferred viewing of programs.

BACKGROUND OF THE INVENTION

In a convergence system in which an information handling system and a television system are combined to provide an enhanced program viewing environment, an electronic program guide (EPG) is often used to determine scheduled programming information such that a user may tailor his or her viewing habits in accordance with the scheduled programming.

For example, the user may use the electronic program guide to determine when his or her favorite program may be scheduled such that he or she could be home to watch the program at the scheduled broadcast time. If a user was unable to be home at the scheduled time, the user could program a videocassette recorder (VCR) to record the television program while the user was away from home so that the program could be viewed at a later time.

However, one disadvantage of such a system is that the user must determine what types of programs he or she would like to watch, monitor the electronic program guide for when those types of programs are scheduled, determine whether the program should be recorded, and then manually program the VCR to record the desired program. Further, it is the user's responsibility to index the program and archive the program in a custom library of programs. It would therefore be highly advantageous to provide a system that automatically performs the above mentioned functions.

SUMMARY OF THE INVENTION

The present invention is directed to a method for implementing a preferred viewing library of programs. In one embodiment, the method includes steps for searching electronic program guide data for a program satisfying a criterion, determining whether a program in the program guide satisfies the criterion, in the event a program in the program guide satisfies the criterion, scheduling to record the program at a predetermined time, monitoring the time and then determining whether the present time is the predetermined time, in the event the present time is the predetermined time, recording the program, and organizing the recorded program in a program library such that a user may select the program from the program library and view the recorded program at an appropriate time.

The present invention is further directed to a system for providing preferred viewing of one or more selected programs. In one embodiment, the system includes a processor for executing a program of instructions on an information handling system, a memory, coupled to the processor, for storing the program of instructions, an electronic program guide executed as the program of instruction by the processor, a recording device coupled to the information handling system and controllable by the electronic program guide, and an information storage medium, readable by the information handling system, onto which one or more programs may be stored in a library of programs on the information storage medium by the electronic program guide wherein the program guide is adapted to search program guide data for a program satisfying a predetermined condition and to record the program in the library on the information storage medium.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
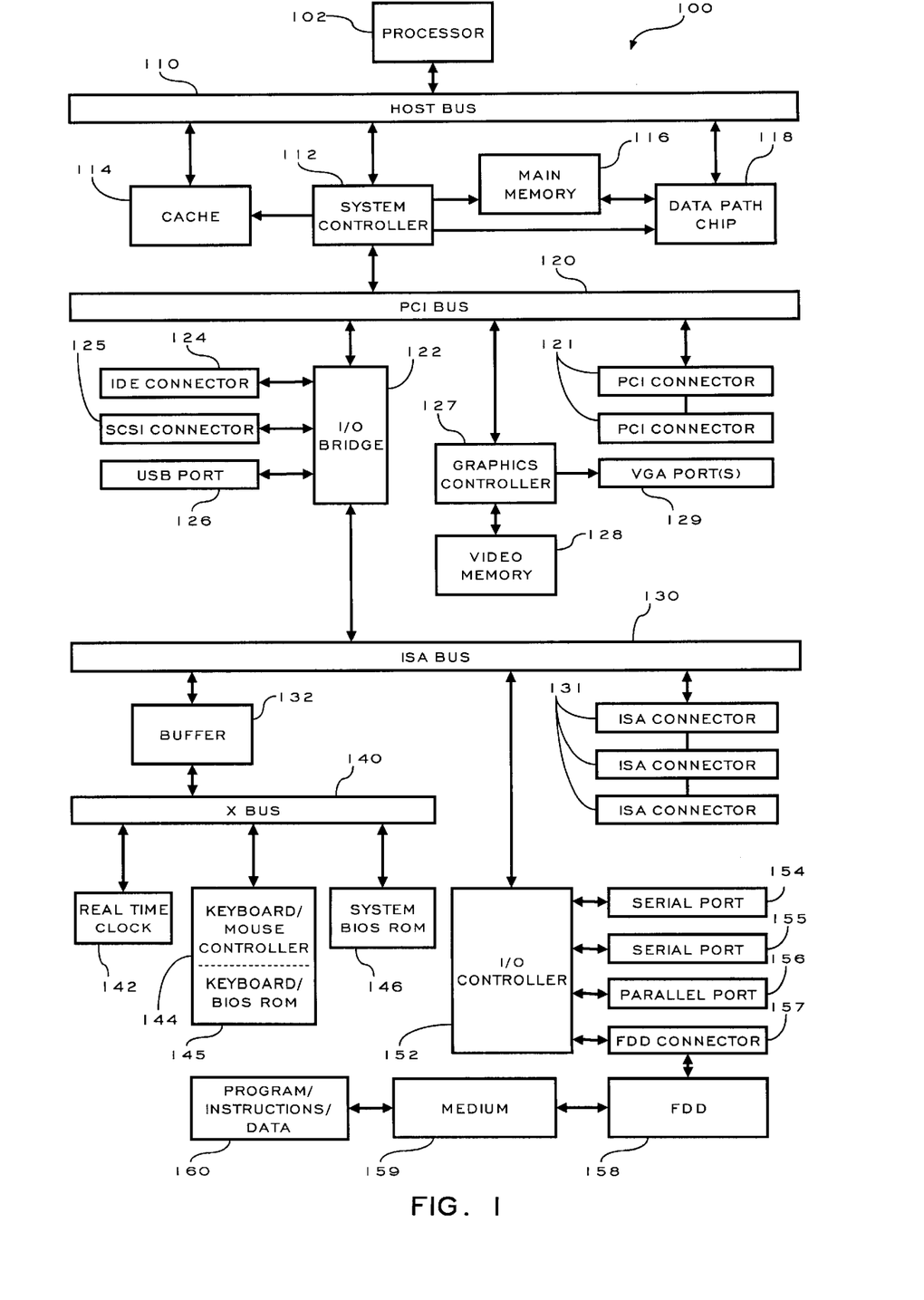
FIG. 1 is a block diagram of an information handling system operable to tangibly embody the present invention.

FIG. 1 shows a block diagram of an information handling system 100 in accordance with the present invention. In this embodiment, processor 102, system controller 112, cache 114, and data-path chip 118 are each coupled to host bus 110. Processor 102 is a microprocessor such as a 486-type chip, a Pentium®, Pentium II®, Pentium III®, or the like suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 112 (i.e. in the near future). Main memory 116 is coupled between system controller 112 and data-path chip 118, and in one embodiment, provides random-access memory of between 16 MB and 128 MB of data.

In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding these components and many of the other components shown in FIG. 1. Main memory 116 includes standard DRAM (Dynamic Random-Access Memory), EDO (Extended Data Out) DRAM, SDRAM (Synchronous DRAM), or the like suitable memory technology. System controller 112 controls PCI (Peripheral Component Interconnect) bus 120, a local bus for system 100 that provides a high-speed data path between processor 102 and various peripheral devices, such as video, disk, network, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121, each of which accepts a standard PCI card (not shown). In one embodiment, I/O bridge 122 and graphics controller 127 are each integrated on the motherboard along with system controller 112, in order to avoid a board-to-connector-to-board signal crossing interface, thereby providing better speed and reliability. In the embodiment shown, graphics controller 127 is coupled to a video memory 128 that includes memory such as DRAM, EDO DRAM, SDRAM, or VRAM (Video Random-Access Memory), and drives VGA (Video Graphics Adapter) port 129. VGA port 129 can connect to VGA-type or SVGA (Super VGA)-type displays or the like. Other input/output (I/O) cards having a PCI interface can be plugged into PCI connectors 121.

In one embodiment, I/O bridge 122 is a chip that provides connection and control to one or more independent IDE connectors 124 and 125, to a USB (Universal Serial Bus) port 126, and to ISA (Industry Standard Architecture) bus 130. In this embodiment, IDE connector 124 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices.

In one similar embodiment, two IDE connectors 124 are provided, and each provide the EIDE (Enhanced IDE) architecture. In the embodiment shown, SCSI (Small Computer System Interface) connector 125 provides connectivity for preferably up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which data and/or program code 160 is stored.

In one such embodiment, program code 160 includes code that controls programmable system 100 to perform the method described below. In another such embodiment, serial port 154 is connectable to a computer network such as the internet, and such network has program code 160 that controls programmable system 100 to perform the method described below. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated. In one embodiment, I/O bridge 122 is a chip that provides connection and control to one or more independent IDE connectors 124 and 125, to a USB (Universal Serial Bus) port 126, and to ISA (Industry Standard Architecture) bus 130. In this embodiment, IDE connector 124 provides connectivity for up to two standard IDE-type devices such as hard disk drives or CD-ROM (Compact Disk-Read-Only Memory) drives, and similarly IDE connector 125 provides connectivity for up to two IDE-type devices. In one such embodiment, IDE connectors 124 and 125 each provide the EIDE (Enhanced IDE) architecture. In one embodiment, I/O bridge 122 provides ISA bus 130 having one or more ISA connectors 131 (in one embodiment, three connectors are provided).

In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146. It should be appreciated that modification or reconfiguration of information handling system 100 of FIG. 1 by one having ordinary skill in the art would not depart from the scope or the spirit of the present invention.

Figure 2:
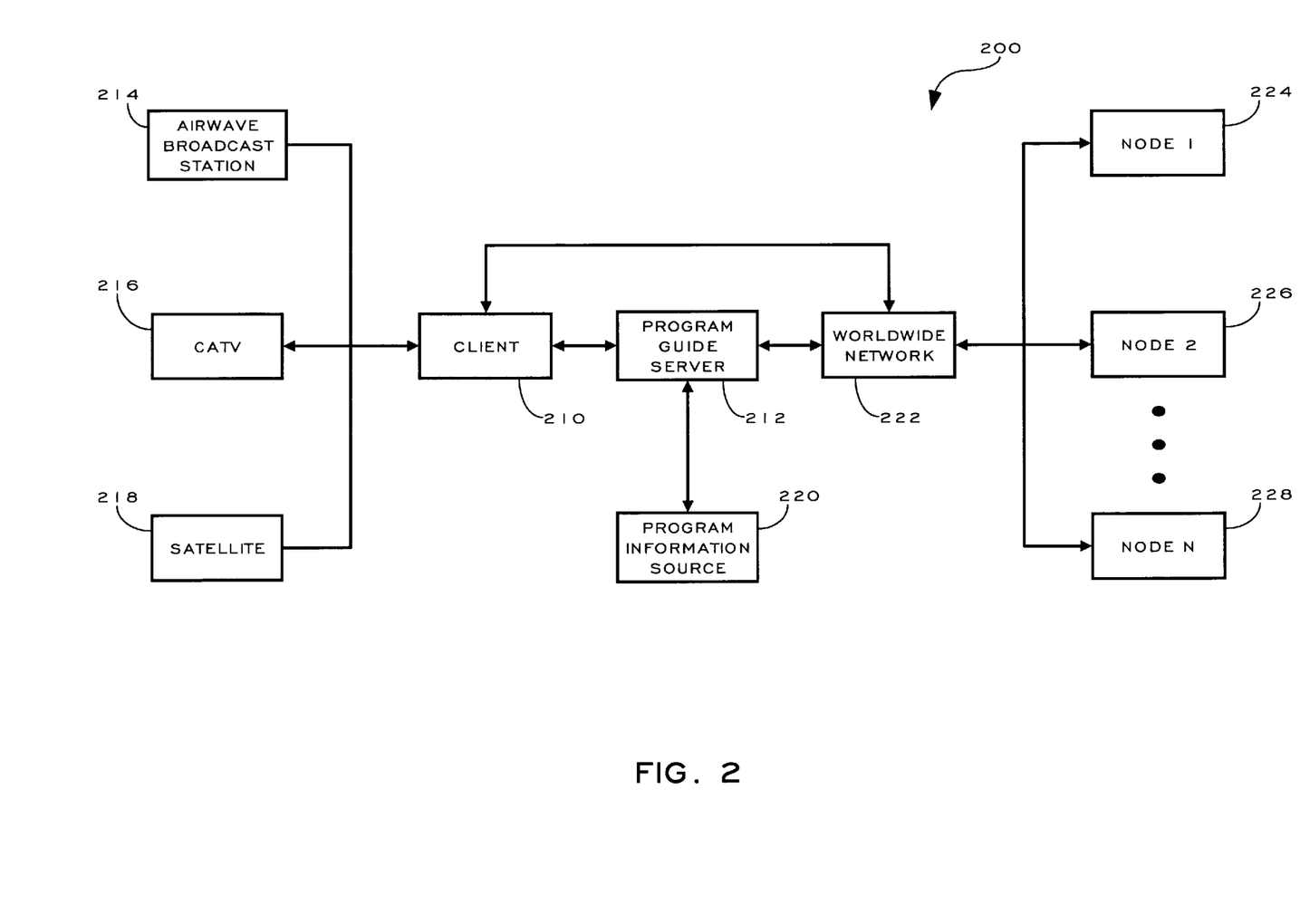
FIG. 2 is a block diagram of an electronic program guide system in accordance with the present invention.

Referring now to FIG. 2, a block diagram of an electronic program guide system in accordance with the present invention will be discussed. The program guide system 200 includes a client system 210 and a program guide server system 212. Client 210 and program guide server 212 may be an information handling system 100 as shown in FIG. 1, however, depending upon the requirements of the intended application, not all of the hardware devices need be included or identical as information handling system 100.

For example, client 210 may utilize an auxiliary processor or coprocessor in addition to processor 102. Program guide server 212 and client 210 preferably, but not necessarily, implement a client-server based architecture wherein the execution of a program of instructions may occur on either client, 210, server 212, or on both client 210 and server 212. Client 210 couples with program guide server 212 for obtaining programming information in the form of an electronic program guide. The program guide may be obtained and processed by program guide server 212 from an appropriate program information source 220 and stored in an information storage medium coupled to program guide server 212. At an appropriate time upon a request by client 210, program guide server 212 may download the program guide to client 210 that is in turn stored in an information storage medium coupled to client 210.

As shown in FIG. 2, client 210 may be configured to receive the program guide from program guide server 212, may be configured to receive programming content from airwave broadcast station 214, cable television provider 216, or satellite television provider 218, or further may be configured to receive content from worldwide network 222. However, it is not necessary that a single device (e.g., client 210) perform all of the aforementioned functions. For example, client 210 may be an information handling system that couples to program guide server 212 to obtain program guide information that may be displayed on a standard television device separate from client 210 wherein the television device receives the program broadcast from airwave broadcast station 214.

Further, a second information handling system may couple to worldwide network 222 to receive and display a multimedia network program. It is preferable, however to provide a single device (e.g., client 210) that is capable of providing all functions described herein. A suitable single device may be, for example, a personal computer and television (PC-TV) convergence device.

Client 210 may be capable of receiving program content from one or more sources. For example, client 210 may include a television tuner as an I/O device for receiving programming from a local airwave broadcast station 214. The programming received from airwave broadcast station 214 may be an analog signal (e.g., being compliant with a National Television Standards Committee or "NTSC" standard) or digital signal (e.g., being compliant with a high-definition television or "HDTV" standard). Client 210 may also receive a cable television signal from a cable television provider 216 by utilizing an appropriate cable television receiver, or may receive a satellite television signal from a satellite television provider 218 by utilizing an appropriate satellite television receiver and antenna.

Furthermore, client 210 may include appropriate hardware for coupling to a worldwide network 222 such as the Internet. Worldwide network 222 may include at least one or more nodes 224 and 226, up to N number of nodes 228, comprising information handling systems similar to information handling system 100 on which programming content may be stored or through which programming content may be delivered and accessible to client 210 via worldwide network 222. For example, one of nodes 224–228 may belong to the National Aeronautics and Space Administration (NASA) who may provide live video coverage of the launch of a space vehicle (e.g., the space shuttle) over worldwide network 222 to client 210. Program information source 220 may include one or several sources of programming information.

For example, program information source 220 may include an information handling system of a local or national television network that makes programming information available to program guide server 212 for future programs to be broadcast, for example, by airwave broadcast station 214, cable television station 216 or satellite television provider 218. Upon being downloaded from program guide server 212 to client 210, the program guide may be displayed on a display coupled to client 210 (e.g., display 114).

Figure 3:
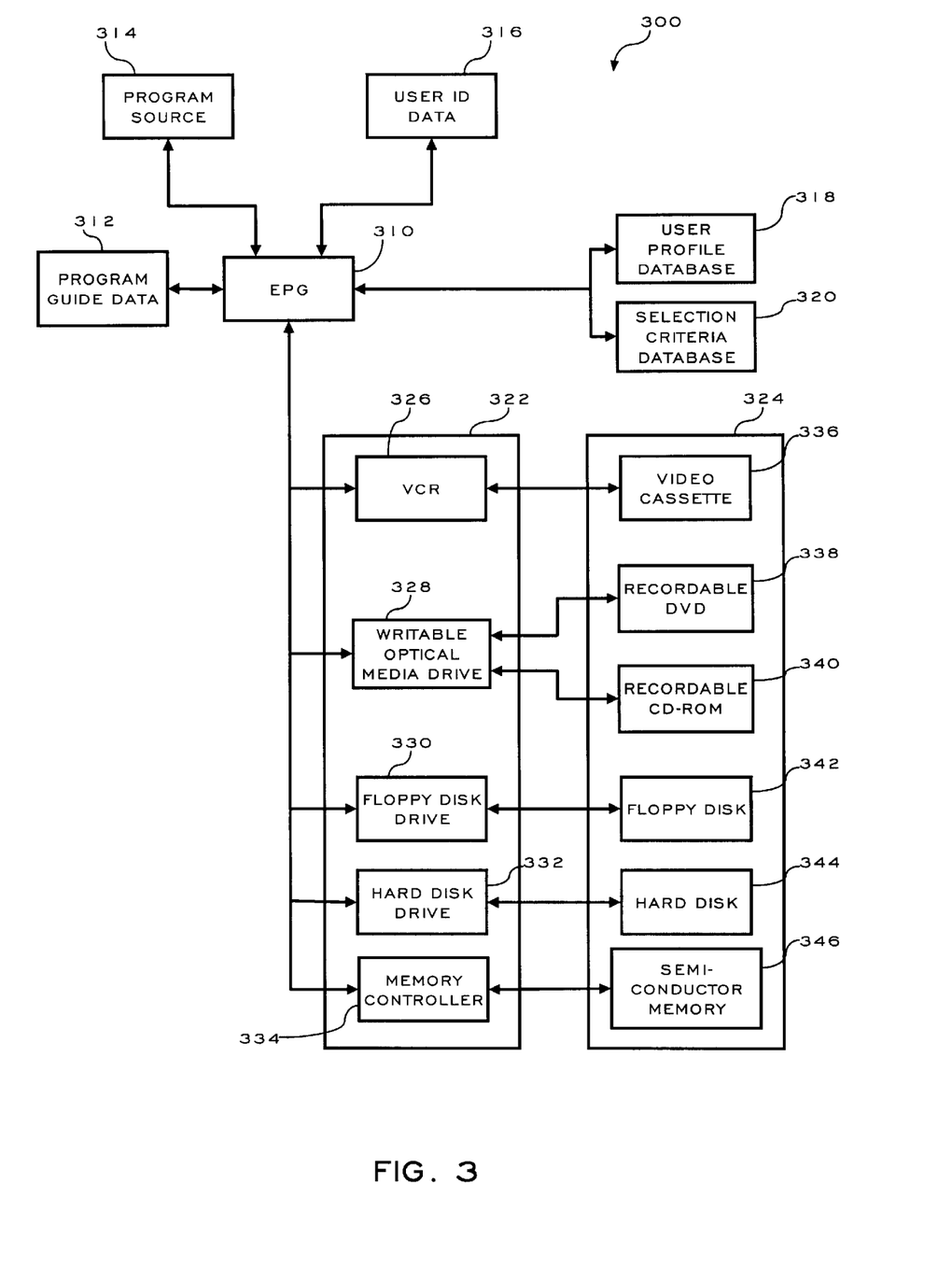
FIG. 3 is a block diagram of a preferred viewing system of the present invention capable of being implemented with the information handling system of FIG. 1.

Referring now to FIG. 3, a preferred viewing system in accordance with the present invention will be discussed. The viewing system 300 in one embodiment is preferably implemented by information handling system 100 of FIG. 1. Electronic program guide 310 receives program guide data 312 from an appropriate source e.g., program information source 220. A program signal (e.g., TV, cable TV, etc.) may be selected by program guide 310 to be received from an appropriate program source 314 (e.g., broadcast station 214, cable TV station 216, satellite 218, etc.). As a user of information handling system 100 manipulates program guide 310 to select desired programs, program guide 310 stores information related to the selected programs in a user profile database 318. The user-related information stored in user profile database 318 may include the categories of programs frequently viewed (e.g., westerns, comedies, sitcoms, educational, etc.) by the user.

In the situation where more than one user shares the same information handling system 100 and program guide 310, each user may be uniquely identified by program guide 310 and have an associated user profile stored in database 318. The user may input identifying information 316 into program guide 310 such that program guide 310 can discriminate between several users. The user may, for example, simply enter his or her name, may enter a code or a password, may speak his or her name, code or password that is automatically recognized using voice recognition software running on information handling system 100, may recognize the face or some other feature of the user by capturing a video image of the user with a camera (e.g., a charge coupled device or CCD) coupled to information handling system 100, or may recognize a fingerprint using fingerprint identification techniques such as through a touch pad on a remote control, and so on, in order to uniquely identify an individual user. Once a user is identified, the user's viewing habits may be monitored by electronic program guide 310 to generate a user profile that is stored in user profile database 318. Alternatively, a user may manually enter the kinds of program categories that the user desires program guide 310 to monitor for such that the user's selection criteria may be stored in a selection criteria database 320.

After a user profile is generated and stored in user profile database 318, or after the user enters and stores program selection criteria in selection criteria database 320, program guide 310 monitors program guide data 312 for programs that fall within the types of categories of programs stored in user profile database 318 or in accordance with information stored in selection criteria database 320. When a program is found in program guide database 312 that is determined to be similar to the user profile programs or satisfies the user selection criteria, program guide 310 schedules the program to be recorded at the scheduled broadcast time of the program. At the scheduled time, program guide 310 causes the program to be recorded with a selected recording device 322. Recording device 322 may include one or more suitable program recording devices or systems coupled with information handling system 100.

For example, recording device 322 may include a videocassette recorder (VCR) 326, a writable optical media drive 328, a floppy disk drive 330, a hard disk drive 332, or memory controller 334 for recording the program on a corresponding recording medium such as videocassette 336, recordable digital versatile disk (DVD) 338, recordable CD-ROM 340, floppy disk 342, hard disk 344, or semiconductor memory 346, respectively. The medium or media upon which one or more programs are stored comprise a library 324 of user customized programs that the user may view at a later time. For example, the user may wish to establish a library of romantic programs for viewing on a special occasion such as Valentine's day. The user inputs romantic programs as a selection criterion on selection criteria database 320. All programs occurring on or before February 14 may be set as another criterion since the user knows that the romantic programs can be viewed no later than Valentine's day. Program guide 310 fetches the romantic program guide criterion from selection criteria database 320 and then monitors program guide data 312 for programs that meet the romantic program criterion.

When program guide 310 identifies one or more programs in program guide data 312 that meet the romantic program criterion (e.g., "Romeo and Juliet", "Casablanca" etc.), and further determines that the programs will be broadcast before the February 14 criterion, program guide 310 schedules to record the identified program or programs. At the scheduled broadcast time, program guide 310 causes the program to be recorded on an appropriate medium 336–346 with the corresponding recording device 322 and stores the programs in program library 324 as a romantic programs category. All of this occurs without intervention by the user after the user enters the desired selection criteria into selection criteria database 320.

In an alternative embodiment, program guide 310 alerts the user before the program is scheduled to be programmed such that the user can confirm whether recording of an identified program is desired. The user may be alerted by an alarm produced by program guide 310 via information handling system 100. Alternatively, if the user is at a remote location using an additional information handling system 100, program guide 310 may remotely contact the user by coupling with the additional information handling system 100 via worldwide network 222. Thus, the user may receive communications via the Internet from program guide 310 running on a home based information handling system 100 while the user is at work working on an information handling system 100 at work to confirm the identified program. When the user arrives at home on February 14, the user may then playback programs stored in library 324 and view the recorded romantic programs.

Figure 4:
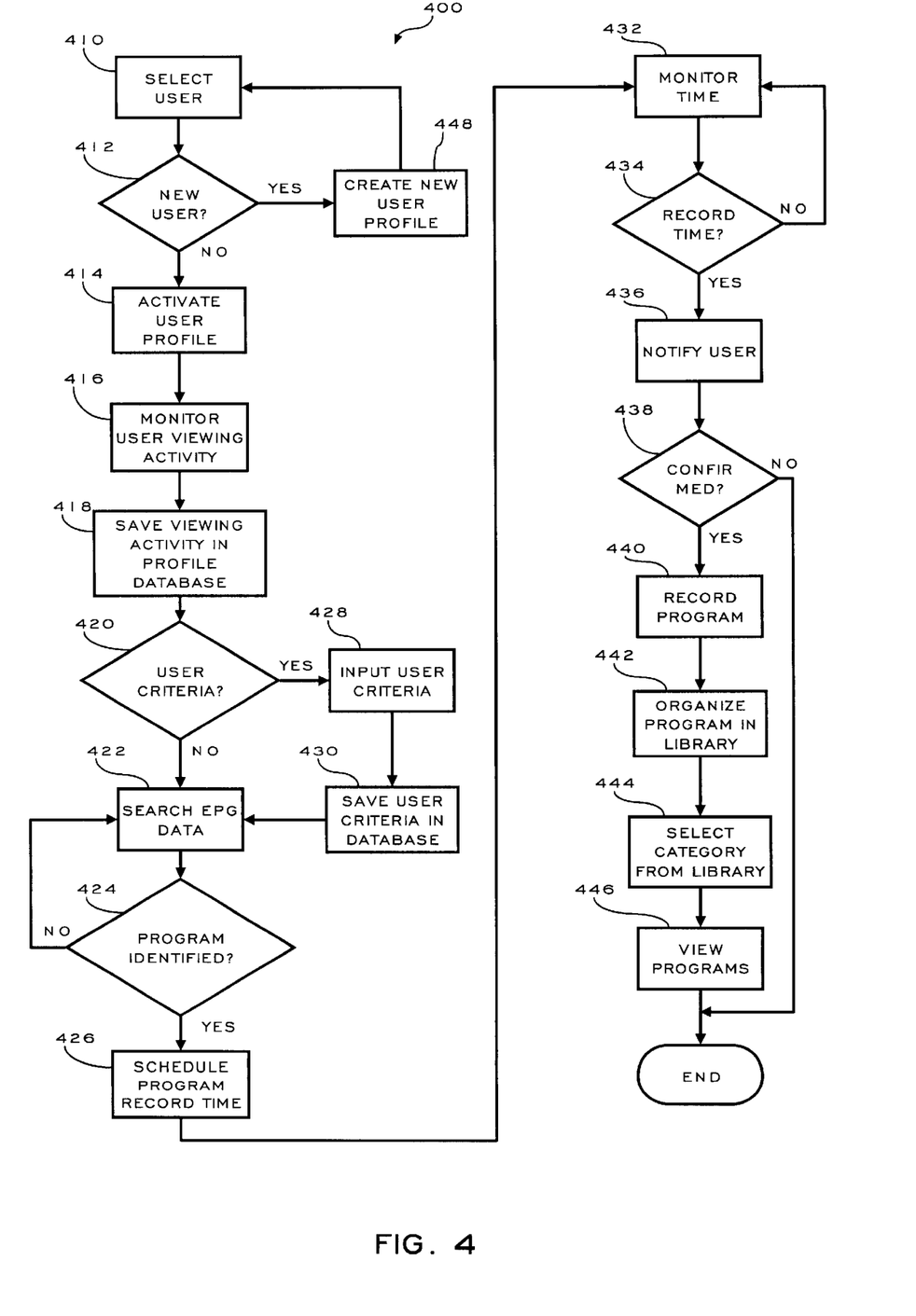
FIG. 4 is a flow diagram of a method for implementing a preferred viewing system in accordance with the present invention.

Referring now to FIG. 4, a flow diagram of a method for implementing a preferred viewing system in accordance with the present invention will be discussed. The method 400 in a preferred embodiment is implemented by program guide 310 executing as a program of instructions for information handling system 100. Method 400 initiates with the selection of a user at step 410. A determination is made at step 412 whether to add a new user to user profile database 318. In the event a new user is to be added, a new user profile is created at step 448 and stored in user profile database 318. After a new user profile is added to profile database 318, the new user is available to be selected at step 410. The profile of the user is selected at step 414 such that monitoring of the user's viewing activity may occur at step 416. The viewing activity of the user is saved at step 418 in the user profile database 318. A determination is made at step 420 whether to utilize user-selected criteria as a basis for searching program guide data 312.

In the event user-selected criteria is to be utilized, the user inputs the program criteria at step 428, and the user-selected criteria is saved at step 430 in selection criteria database 320. The electronic program guide data 312 is searched at step 422 based upon user profile database 318 or selection criteria database 318, alone or in combination, and a determination is made at step 424 whether a program meeting the user profile or user selection criteria is identified in program guide data 312. In the event no program is identified, EPG data 312 is continued to be searched at step 312 (for example, periodically or upon receiving an update of program guide data 312) until a program satisfying the user profile or selection criteria is identified in program guide data 312. In the event a program is identified, a program record time is scheduled at step 426. Program guide 310 monitors the time at step 432 such that a determination may be made at step 434 whether the scheduled program time has been reached. In the event the scheduled program time is reached, the user may be notified at step 436 that program guide 310 is about to record an identified program. Upon notification, the user may select to confirm the recording of the identified program or may choose not to record the program. A determination is made at step 438 whether the identified program is confirmed to be recorded. In the event the recording of the program is confirmed, the program is recorded at step 440. The program is organized into program library 324 at step 442, for example categorized by subject matter. The user may then select a category from library 324 at step 444 and view the programs at step 446 that are stored in library 324, for example programs organized in a subject matter category.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 116 of one or more computer information handling systems configured generally as described in FIG. 1. Until required by the computer system, the set of instructions may be stored in another computer readable memory such as information storage medium 159 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot.

Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions, applets or servlets physically changes the medium upon which it is stored electrically, magnetically, chemically, physically, optically or holographically so that the medium carries computer readable information.

The system and method of "personal preferred viewing using electronic program guide" of the present invention, and many of its attendant advantages, is disclosed by the forgoing description, and it is understood that various changes may be made in the form, construction and arrangement of the components thereof without departing from the scope and spirit of the invention, or without sacrificing all of its material advantages. The preferred embodiments disclosed herein are merely an explanatory embodiment thereof It is the intention of the following claims to encompass and include such changes.

What is claimed is:

1. A method for implementing a preferred viewing library of programs, comprising:

monitoring the viewing activity of a user;

saving the viewing activity of the user in a database;

searching electronic program guide data for a program satisfying a criterion based upon the viewing activity of the user stored in the database;

determining whether a program in the program guide satisfies the criterion;

in the event a program in the program guide satisfies the criterion, scheduling to record the program at a predetermined time;

monitoring the time and then determining whether the present time is the predetermined time;

in the event the present time is the predetermined time, notifying the user that the program is to be recorded and confirming whether the program should be recorded;

in the event it is confirmed that the program should be recorded, recording the program; and organizing the recorded program in a program library such that a user may select the program from the program library and view the recorded program at an appropriate time.

2. A method as claimed in claim 1, further comprising the steps of:

receiving a user selection criterion;

saving the user selection criterion in the database; and executing said searching step and said determining step based upon the user selection criterion stored in the database.

3. A method as claimed in claim 1, further comprising the steps of:

in the event there are two or more users, selecting one of the two or more users based on identifying information of the selected user, wherein the identifying information includes at least one of: a code, a password, and biometrics;

monitoring the viewing activity of the selected user;

saving the viewing activity of the selected user in a database unique to the selected user; and executing said searching step and said determining step based upon the viewing activity of the selected user stored in the database.

4. A method as claimed in claim 1, further comprising the steps of:

in the event there are two or more users, selecting one of the two or more users based on identifying information of the selected user, wherein the identifying information includes at least one of: a code, a password, and biometrics;

receiving a user selection criterion from the selected user;

saving the user selection criterion in a database unique to the selected user; and executing said searching step and said determining step based upon the user selection criterion stored in the database.

5. A program of instructions storable on a medium readable by an information handling system for causing an information handling system to execute steps for implementing a preferred viewing library of programs, the steps comprising:

monitoring the viewing activity of a user;

saving the viewing activity of the user in a database;

searching electronic program guide data for a program satisfying a criterion based upon the viewing activity of the user stored in the database;

determining whether a program in the program guide satisfies the criterion;

in the event a program in the program guide satisfies the criterion, scheduling to record the program at a predetermined time;

monitoring the time and then determining whether the present time is the predetermined time;

in the event the present time is the predetermined time, notifying the user that the program is to be recorded and confirming whether the program should be recorded; and in the event it is confirmed that the program should be recorded, recording the program; and organizing the recorded program in a program library such that a user may select the program from the program library and view the recorded program at an appropriate time.

6. A program of instructions as claimed in claim 5, the steps further comprising the steps of:

receiving a user selection criterion;

saving the user selection criterion in the database; and executing said searching step and said determining step based upon the user selection criterion stored in the database.

7. A program of instructions as claimed in claim 5, the steps further comprising the steps of:

in the event there are two or more users, selecting one of the two or more users based on identifying information of the selected user, wherein the identifying information includes at least one of: a code, a password, and biometrics;

monitoring the viewing activity of the selected user;

saving the viewing activity of the selected user in a database unique to the selected user; and executing said searching step and said determining step based upon the viewing activity of the selected user stored in the database.

8. A program of instructions as claimed in claim 5, the steps further comprising the steps of:

in the event there are two or more users, selecting one of the two or more users based on identifying information of the selected user, wherein the identifying information includes at least one of: a code, a password, and biometrics;

receiving a user selection criterion from the selected user;

saving the user selection criterion in a database unique to the selected user; and executing said searching step and said determining step based upon the user selection criterion stored in the database.

9. A system for providing preferred viewing of one or more selected programs, comprising:

a processor for executing a program of instructions on an information handling system;

a memory, coupled to said processor, for storing the program of instructions;

an electronic program guide executed as the program of instruction by said processor;

a recording device coupled to the information handling system and controllable by said electronic program guide; and an information storage medium, readable by the information handling system, onto which one or more programs may be stored in a library of programs on said information storage medium by said electronic program guide wherein said program guide is adapted for:

monitoring the viewing activity of a user;

saving the viewing activity of the user in a database;

searching electronic program guide data for a program satisfying a criterion based upon the viewing activity of the user stored in the database;

determining whether a program in the program guide satisfies the criterion;

in the event a program in the program guide satisfies the criterion, scheduling to record the program at a predetermined time;

monitoring the time and then determining whether the present time is the predetermined time;

in the event the present time is the predetermined time, notifying the user that the program is to be recorded and confirming whether the program should be recorded;

in the event it is confirmed that the program should be recorded, recording the program; and organizing the recorded program in a program library such that a user may select the program from the program library and view the recorded program at an appropriate time.

10. A system as claimed in claim 9, further comprising a user profile database stored in said memory wherein said electronic program guide searches the program guide data based upon a user profile spin said user profile database.

11. A system as claimed in claim 9, further comprising a user selection criteria database stored in said memory wherein said electronic program guide searches the program guide data based upon a user selection criterion stored in said user selection criteria database.

12. A system for providing preferred viewing of one or more selected programs, comprising:
   means for executing a program of instructions on an information handling system;
   means, coupled to said processor, for storing the program of instructions;
   means, executed as the program of instruction by said processor, for implementing the system;
   means, coupled to the information handling system and controllable by said implementing means, for recording a program; and
   means, readable by the information handling system, for storing the program, said storing means capable of storing one or more programs in a library of programs on said storing means by said implementing means wherein said implementing means is for:
   monitoring the viewing activity of a user;
   saving the viewing activity of the user in a database;
   searching electronic program guide data for a program satisfying a criterion based upon the viewing activity of the user stored in the database;
   determining whether a program in the program guide satisfies the criterion;
   in the event a program in the program guide satisfies the criterion, scheduling to record the program at a predetermined time;
   monitoring the time and then determining whether the present time is the predetermined time;
   in the event the present time is the predetermined time, notifying the user that the program is to be recorded and confirming whether the program should be recorded;
   in the event it is confirmed that the program should be recorded, recording the program; and
   organizing the recorded program in a program library such that a user may select the program from the program library and view the recorded program at an appropriate time.

13. A system as claimed in claim 12, further comprising a means for organizing data stored on said storing means wherein said implementing means searches the program guide data based upon a user profile stored in said organizing means.

14. A system as claimed in claim 12, further comprising a means for organizing data stored on said storing means wherein said implementing means searches the program guide data based upon a user selection criterion stored in said organizing means.

15. A method for implementing a preferred viewing library of programs, comprising:
   in the event there are two or more users, selecting one of the two or more users based on identifying information of the selected user, wherein the identifying information includes at least one of: a code, a password, and biometrics;
   monitoring the viewing activity of a user;
   saving the viewing activity of the user in a database;
   searching electronic program guide data for a program satisfying a criterion based upon the viewing activity of the user stored in the database;
   determining whether a program in the program guide satisfies the criterion;
   in the event a program in the program guide satisfies the criterion, scheduling to record the program at a predetermined time;
   monitoring the time and then determining whether the present time is the predetermined time;
   in the event the present time is the predetermined time, notifying the user that the program is to be recorded and confirming whether the program should be recorded;
   in the event it is confirmed that the program should be recorded, recording the program;
   organizing the recorded program in a program library such that a user may select the program from the program library and view the recorded program at an appropriate time.

16. The method of claim 15, further comprising the steps of:
   alerting the user, prior to recording, by one of the group consisting of an alarm or a remote contact by coupling via the worldwide network;
   monitoring the viewing activity of the selected user;
   saving the viewing activity of the selected user in a database unique to the selected user; and
   executing said searching step and said determining step based upon the viewing activity of the selected user stored in the database.

17. A program of instructions storable on a medium readable by an information handling system to execute steps for implementing a preferred viewing library of programs, the steps comprising:
   in the event there are two or more users, selecting one of the two or more users based on identifying information of the selected user, wherein the identifying information includes at least one of: a code, a password, and biometrics;
   monitoring the viewing activity of a user;
   saving the viewing activity of the user in a database;
   searching electronic program guide data for a program satisfying a criterion based upon the viewing activity of the user stored in the database;
   determining whether a program in the program guide satisfies the criterion;
   in the event a program in the program guide satisfies the criterion, scheduling to record the program at a predetermined time;
   monitoring the time and then determining whether the present time is the predetermined time;
   in the event the present time is the predetermined time, notifying the user that the program is to be recorded and confirming whether the program should be recorded;
   in the event it is confirmed that the program should be recorded, recording the program;
   organizing the recorded program in a program library such that a user may select the program from the program library and view the recorded program at an appropriate time.

18. The program of instructions of claim 17, further comprising the steps of:
   alerting the user, prior to recording, by one of the group consisting of an alarm or a remote contact by coupling via the worldwide network;
   monitoring the viewing activity of the selected user;
   saving the viewing activity of the selected user in a database unique to the selected user; and executing said searching step and said determining step based upon the viewing activity of the selected user stored in the database.

19. A system for providing preferred viewing of one or more selected programs, comprising:
   a processor for executing a program of instructions on an information handling system;
   a memory, coupled to said processor, for storing the program of instructions;
   an electronic program guide executed as the program of instructions by said processor;
   a recording device coupled to the information handling system and controllable by said electronic program guide; and
   an information storage medium, readable by the information handling system, onto which one or more programs may be stored in a library of programs on said information storage medium by said electronic program guide wherein said program guide is adapted for:
      in the event there are two or more users, selecting one of the two or more users based on identifying information of the selected user, wherein the identifying information includes at least one of: a code, a password, and biometrics;
      monitoring the viewing activity of a user;
      saving the viewing activity of the user in a database;
      searching electronic program guide data for a program satisfying a criterion based upon the viewing activity of the user stored in the database;
      determining whether a program in the program guide satisfies the criterion;
      in the event a program in the program guide satisfies the criterion, scheduling to record the program at a predetermined time;
      monitoring the time and then determining whether the present time is the predetermined time;
      in the event the present time is the predetermined time, notifying the user that the program is to be recorded and confirming whether the program should be recorded;
      in the event it is confirmed that the program should be recorded, recording the program;
      alerting the user, prior to recording, by one of the group consisting of an alarm or remote contact by coupling via the worldwide network; and
      organizing the recorded program in a program library such that a user may select the program from the program library and view the recorded program at an appropriate time.

20. A system for providing preferred viewing of one or more selected programs, comprising:
   means for executing a program of instructions on an information handling system;
   means, coupled to said processor, for storing the program of instructions;
   means, executed as the program of instructions by said processor, for implementing the system;
   means, coupled to the information handling system and controllable by said implementing means, for recording a program; and
   means, readable by the information handling system, for storing the program, said storing means capable of storing one or more programs in a library of programs on said storing means by said implementing means wherein said implementing means is for:
      in the event there are two or more users, selecting one of the two or more users based on identifying information of the selected user, wherein the identifying information includes at least one of: a code, a password, and biometrics;
      monitoring the viewing activity of a user;
      saving the viewing activity of the user in a database;
      searching electronic program guide data for a program satisfying a criterion based upon the viewing activity of the user stored in the database;
      determining whether a program in the program guide satisfies the criterion;
      in the event a program in the program guide satisfies the criterion, scheduling to record the program at a predetermined time;
      monitoring the time and then determining whether the present time is the predetermined time;
      in the event the present time is the predetermined time, notifying the user that the program is to be recorded and confirming whether the program should be recorded;
      in the event it is confirmed that the program should be recorded, recording the program;
      alerting the user, prior to recording, by one of the group consisting of an alarm or remote contact by coupling via the worldwide network; and
      organizing the recorded program in a program library such that a user may select the program from the program library and view the recorded program at an appropriate time.

21. A method for implementing a preferred viewing library of programs, comprising:
   in the event there are two or more users, selecting one of the two or more users based on identifying information of the selected user, wherein the identifying information includes at least one of: a code, a password, the user's speaking a code or password, the user's face, or the user's fingerprint;
   monitoring the viewing activity of a user;
   saving the viewing activity of the user in a database;
   searching electronic program guide data for a program satisfying a criterion based upon the viewing activity of the user stored in the database;
   determining whether a program in the program guide satisfies the criterion;
   in the event a program in the program guide satisfies the criterion, scheduling to record the program at a predetermined time;
   monitoring the time and then determining whether the present time is the predetermined time;
   in the event the present time is the predetermined time, notifying the user that the program is to be recorded and confirming whether the program should be recorded;
   in the event it is confirmed that the program should be recorded, recording the program; and
   organizing the recorded program in a program library such that a user may select the program from the program library and view the recorded program at an appropriate time.

22. A method for implementing a preferred viewing library of programs, comprising:
   monitoring the viewing activity of a user;
   saving the viewing activity of the user in a database;
   searching electronic program guide data for a program satisfying a criterion based upon the viewing activity of the user stored in the database;

determining whether a program in the program guide satisfies the criterion;

in the event a program in the program guide satisfies the criterion, scheduling to record the program at a predetermined time;

monitoring the time and then determining whether the present time is the predetermined time;

in the event the present time is the predetermined time, notifying the user that the program is to be recorded and confirming whether the program should be recorded;

in the event it is confirmed that the program should be recorded, recording the program;

alerting the user, prior to recording, by one of the group consisting of an alarm or remote contact by coupling via the worldwide network; and organizing the recorded program in a program library such that a user may select the program from the program library and view the recorded program at an appropriate time.

* * * * *